United States Patent [19]

Simpson et al.

[11] Patent Number: 5,210,061

[45] Date of Patent: May 11, 1993

[54] RESID HYDROPROCESSING CATALYST

[75] Inventors: Howard D. Simpson, Irvine; Marvin J. Schwedock; John W. Ward, both of Yorba Linda, all of Calif.

[73] Assignee: Union Oil Company of California, Los Angeles, Calif.

[21] Appl. No.: 764,814

[22] Filed: Sep. 24, 1991

[51] Int. Cl.$^5$ .................... B01J 21/12; B01J 23/85
[52] U.S. Cl. .................... 502/254; 502/258; 502/263
[58] Field of Search ............ 502/254, 263, 258

[56] References Cited

U.S. PATENT DOCUMENTS

| | | | |
|---|---|---|---|
| 3,509,044 | 4/1970 | Adams et al. | 208/216 |
| 3,814,682 | 6/1974 | Christman et al. | 208/216 |
| 4,048,060 | 9/1977 | Riley | 208/210 |
| 4,069,139 | 1/1978 | Riley et al. | 208/216 |
| 4,113,656 | 9/1978 | Riley et al. | 252/439 |

Primary Examiner—Carl F. Dees
Attorney, Agent, or Firm—Gregory F. Wirzbicki; Alan H. Thompson

[57] ABSTRACT

A catalyst useful for hydroprocessing a hydrocarbon-containing oil contains at least one hydrogenation component on an amorphous, porous refractory oxide support containing between 2 and 8 weight percent of silica. The catalyst is prepared by impregnating support particles having a narrow pore size distribution and a median pore diameter greater than about 120 angstroms with a solution containing precursors of the hydrogenation components, followed by drying and calcining. The catalyst is useful for promoting a number of hydrocarbon hydroprocessing reactions, particularly simultaneous hydrogenative desulfurization, demetallization and denitrogenation of residuum-containing oils.

21 Claims, No Drawings

RESID HYDROPROCESSING CATALYST

BACKGROUND OF THE INVENTION

1. Field of the Invention

This invention relates to hydrocarbon hydroprocessing catalysts, such as those utilized to catalyze the reaction of hydrogen with organonitrogen, organosulfur and organometallic compounds. More particularly this invention is directed to a catalyst useful for the hydrodesulfurization, hydrodenitrogenation and hydrodemetallation of hydrocarbon-containing feeds, such as residuum oils, and to a method for preparing such catalysts by employing an aqueous impregnating solution with porous, amorphous refractory oxide support particles.

2. Description of Prior Art

In the refining of hydrocarbons, it is often necessary to convert a hydrocarbon-containing oil fraction to different forms. Typically, particulate catalysts are utilized to promote desulfurization, denitrogenation or demetallization reactions when feedstocks such as residuum-containing oils are contacted with catalysts under conditions of elevated temperature and pressure and in the presence of hydrogen so that the sulfur components are converted to hydrogen sulfide, the nitrogen components to ammonia and the metals are deposited on the catalyst.

Hydroprocessing of hydrocarbon-containing oils may be carried out with a catalyst containing Group VIB and Group VIII hydrogenation metals on a refractory oxide support. Compositions containing these and other elements have been previously prepared by comulling and impregnation methods with supports with various pore size distributions.

Generally, such hydroprocessing catalysts having a substantial number of pores of diameter less than 120 angstroms have been effective for catalyzing desulfurization and denitrogenation reactions in residuum feedstocks, while catalysts having a substantial amount of pore volume in relatively larger pores (particularly pores of diameter greater than about 150 angstroms) have been effective for removal of contaminant metals (such as nickel and vanadium) from such feedstocks. In other words, hydroprocessing catalysts having larger sized pores have demonstrated greater effectiveness for demetallation of a residuum feedstock than catalysts of smaller sized pores and the two types of functions, i.e., demetallation and desulfurization, generally result in mutually exclusive pore sizes being preferred.

Examples of catalysts useful for hydroprocessing residuum-containing oils comprising a Group VIB metal, particularly molybdenum or tungsten, and a Group VIII metal, particularly cobalt or nickel, on an alumina base have been disclosed in U.S. Pat. Nos. 4,048,060, 3,509,044 and 4,460,707. The catalyst in U.S. Pat. No. 4,460,707 is disclosed to have excellent metals removal capacity and has an average pore diameter greater than about 180 angstroms and is prepared by impregnation, that is, by deposition of the active components on the support base by contact thereof with an aqueous solution containing the hydrogenation components in dissolved form. In U.S. Pat. No. 4,048,060 a catalyst having a relatively large average pore diameter between 140 and 190 angstroms is prepared by impregnating support materials containing minor amounts of silica, i.e., less than about 1.0 weight percent of silica with precursors of hydrogenation metals. Other alumina-containing catalysts disclosed in U.S. Pat. Nos. 4,048,060 as well as 3,509,044 contain about 1 to 6 weight percent of silica and have pore size distributions with a relatively small average pore diameter from 60 to 120 angstroms, and a maximum pore volume in pores of diameter from 30 to 70 angstroms, respectively.

Although conventional catalysts are active and stable for hydrocarbon hydroprocessing reactions, catalysts of yet higher activities and stabilities are still being sought. Increasing the activity of a catalyst increases the rate at which a chemical reaction proceeds under given conditions, and increasing the stability of a catalyst increases its resistance to deactivation, that is, the useful life of the catalyst is extended. In general, as the activity of catalyst is increased, the conditions required to produce a given end product, such as a hydrocarbon of given sulfur, nitrogen, and/or contaminant metals content, become more mild. Milder conditions require less energy to achieve the desired product, and catalyst life is extended due to such factors as lower coke formation or the deposition of less metals. The search continues for catalysts which are highly active for catalyzing both demetallation and desulfurization reactions during hydrocarbon hydroprocessing.

SUMMARY OF THE INVENTION

Briefly, the invention provides for a catalyst useful for hydroprocessing hydrocarbon-containing feedstocks and a method for preparing such a catalyst from an amorphous, porous refractory oxide support containing between 2 and 8 weight percent of silica. The percentages of silica contained in the support are critical, particularly when the final catalyst has a narrow pore size distribution containing a median pore diameter greater than 120 angstroms. The present invention provides a surprisingly effective composition for catalyzing reactions for removing contaminant compounds in hydrocarbon-containing feedstocks, for example, the simultaneous hydroconversion of complex organosulfur, organonitrogen and organometallic contaminant compounds.

In one embodiment, a catalyst is obtained from an impregnation of the silica-containing support particles and contains at least one metal hydrogenation component in an amount less than 15 weight percent (calculated as a trioxide). The catalyst has a pore size distribution wherein (1) at least 45 percent of the total pore volume is in pores of diameter from about 20 angstroms above to about 20 angstroms below a median pore diameter in the range from 120 to 240 angstroms, (2) less than 10 percent of the total pore volume is in pores of diameter greater than 300 angstroms, and (3) less than 10 percent of the total pore volume is in pores of diameter less than 100 angstroms.

In a preferred embodiment, a hydroprocessing catalyst is prepared by the method of impregnating support particles containing alumina-silica and having a narrow pore size distribution with an aqueous impregnating solution comprising a dissolved molybdenum component and a dissolved nickel or cobalt component, followed by calcination. In this embodiment, the catalyst contains about 4 to about 15 weight percent of molybdenum components (as $MoO_3$), about 0.01 to about 6 weight percent of cobalt or nickel components (calculated as the monoxide), about 1.8 to about 7.8 weight percent of silica (calculated as $SiO_2$), and the balance of gamma alumina. The catalyst has porosity characteristics including at least 50 percent of the total pore volume in pores of diameter from about 20 angstroms above to 20 angstroms below a median pore diameter in the range from above 120 to 180 angstroms and less than about 10 percent of the total pore volume in pores of diameter greater than 300 angstroms.

Catalysts prepared in accordance with the invention are particularly useful for promoting the hydroprocessing of hydrocarbon-containing residuum oils. A catalyst prepared with the support particulates described above exhibits high activity and stability when utilized to promote high conversions of organosulfur and organonitrogen compounds found in hydrocarbon residuum-containing feeds to hydrogen sulfide and ammonia, respectively. During upgrading of such feedstocks, the catalyst of the invention also demonstrates surprisingly high activity for the simultaneous conversion of organometallic compounds to forms which deposit on the catalyst. Accordingly, the catalyst of the invention is particularly useful for simultaneously promoting demetallation and desulfurization reactions during hydroprocessing of residuum-containing feedstocks.

DETAILED DESCRIPTION OF THE INVENTION

The invention is directed to a catalyst, usually a catalyst useful for hydroprocessing a hydrocarbon-containing oil. The catalyst is particularly well suited for hydrodesulfurization of a residuum-containing oil. The catalyst typically contains up to 15 weight percent of at least one active metal hydrogenation component (calculated as the metal trioxide), ordinarily a metal component selected from the group consisting of Group VIB metals and Group VIII metals. Such metal components are supported on any nonzeolitic support particle comprising a porous, amorphous refractory oxide having a critical content of silica greater than (but not including) 2.0 and less than (but not including) 8.0 weight percent, calculated as $SiO_2$. Silica contents greater than 2.2 and less than 4.5 weight percent of silica are preferred. As shown hereinafter in the examples, such silica content in the supports provides catalysts having surprisingly improved activity and stability properties for simultaneous hydroconversion of organosulfur, organonitrogen and organometallic compounds compared to two catalysts having supports containing silica in proportions of 2.0 and 8.0 weight percent, respectively, both of which are outside the critical range of the invention. With respect to the overall silica content of a catalyst of the invention, the increase in proportion of hydrogenation components on the support proportionately diminishes the overall content of silica in the catalyst. The overall content of silica in the catalyst is usually about 1.5 to about 8.0 weight percent, preferably between 1.8 and 7.8 weight percent, and most preferably between 2.2 and 4.5 weight percent, calculated as $SiO_2$.

Support particles suitable for use herein include such porous amorphous refractory oxides as magnesia, zirconia, titania, alumina, including refractory oxide mixtures wherein alumina is a major proportion of the support, for example, lithium-alumina, phosphorus-alumina, lithium-phosphorus-alumina, and the like, with supports containing alumina having greater than 2.0 weight percent of silica (calculated as $SiO_2$) being required. Supports containing gamma alumina are the most highly preferred, particularly those supports containing at least 80, and preferably at least 90 weight percent of gamma alumina. Preferred support particles having the preferred physical characteristics disclosed herein may be obtained from AKZO-Chemie and Criterion Catalyst Company, L.P. Mixtures of the foregoing refractory oxides are also contemplated, especially when prepared as homogeneously as possible.

The amorphous, porous refractory oxide support material is usually prepared in the form of shaped particulates, with the preferred method being to extrude a precursor of the desired support through a die having openings therein of desired size and shape, after which the extruded matter is cut into extrudates of desired length. The precursor may be a refractory oxide such as a spray-dried or peptized alumina gel. The support particles may also be prepared by mulling (or pulverizing) a pre-calcined porous refractory oxide to a particle size less than about 100 microns and extruding the material, with an extruding aid if necessary. Also, the support particles may be prepared by extruding a combination of precursor and mulled pre-calcined porous refractory oxide in a weight ratio in the range from about 1:20 to about 20:1.

An exemplary precursor of the support can be prepared by precipitating the oxides or hydrated oxides of silicon with those of titanium, magnesium, zirconium, but preferably aluminum, from aqueous solutions of salts of these metals. Suitable proportions of the water soluble salts of aluminum such as the sulfate, chloride or nitrate and suitable proportions of water soluble silicon containing salts such as sodium silicate are precipitated from solution by adjusting the pH of the solution with acidic or basic material. Preferred methods include treating alkaline or acidic aqueous aluminate solutions which contain predetermined amounts of silica with respective acidic or basic reagents to precipitate an aluminosilicate material in the hydrous form. Exemplary methods of incorporating silica into porous refractory oxide supports such as alumina to prepare supports utilized in the present invention are disclosed in U.S. Pat. Nos. 2,437,531, 2,437,532, 2,437,532, and 3,509,044, the disclosures of which are incorporated by reference herein in their entireties. The precipitates are usually washed, and otherwise treated to remove impurities (particularly sodium) as necessary by known methods.

The support particles prepared in the form of gel extrudates are generally pre-calcined prior to impregnation, especially if a combination of gamma alumina-silica is the desired support material. Calcination temperatures above about 900° F. are usually required to convert the precursor of the desired support to the porous, amorphous refractory oxide form, as for example, the conversion of alumina-silica gel to gamma alumina containing silicon components, particularly silica. Usually, temperatures above about 1,100° F. are utilized to effect this transformation, with periods of one-half to three hours generally being utilized to produce preferred gamma alumina-silica extrudates.

The extruded particles may have any cross-sectional shape, i.e., symmetrical or asymmetrical, but most often have a symmetrical cross-sectional shape, preferably a cylindrical or polylobal shape. The cross-sectional diameter of the particles is usually about 1/40 to about 1/5 inch, preferably about 1/32 to about 1/12 inch, and most preferably about 1/24 to about 1/15 inch. Among the preferred catalyst configurations are cross-sectional shapes resembling that of a three-leaf clover, as shown, for example, in FIGS. 8 and 8A of U.S. Pat. No. 4,028,777. Preferred clover-shaped particulates are such that each "leaf" of the cross section is defined by about a 270° arc of a circle having a diameter between about 0.02 and 0.05 inch. Other preferred particulates are those having quadralobal cross-sectional shapes, including asymmetrical shapes, and symmetrical shapes such as in FIG. 10 of U.S. Pat. No. 4,028,227. Other particulates are available from Davison Chemical Company, a division of W. R. Grace & Company, having ring and minilith shapes, as disclosed in U.S. Pat. No. 4,510,261. Preferred shapes typically include any shape having a surface-to-volume ratio greater than that of a cylinder.

An impregnating solution containing at least one hydrogenation component precursor may be utilized to incorporate the catalytically active hydrogenation components with any of the amorphous, porous refractory support particles. A variety of the preferred Group VIB metal components may be utilized to produce a stable impregnating solution. In general, all Group VIB metal compounds soluble in aqueous media, particularly those of molybdenum or tungsten, may be utilized. The oxides of molybdenum (e.g. molybdenum trioxide) are preferred, as are many salts containing molybdenum, particularly precursors of molybdenum trioxide. Also useful are salts containing both a Group VIB metal and ammonium ion, such as ammonium dimolybdate, and most preferably ammonium heptamolybdate. Preferably, the final solution contains Group VI components (as the trioxide) in a total concentration between about 2 and 17 weight percent and more preferably about 4 to about 12 weight percent. Suitable Group VIII metal compounds are water-soluble, and usually include an oxide, carbonate, and preferably a nitrate of cobalt, nickel, and iron or combinations thereof. The nitrates of cobalt and nickel are preferred. Preferably, the final solution contains Group VIII components (as the monoxide) in a total concentration between about 0.01 and 10 weight percent and more preferably about 1 to about 6 weight percent. Although phosphorus is usually not included in the final catalyst, if desired, the final impregnating solution may contain about 0.5 to about 5 weight percent of phosphorus, calculated as P. Although not usually remaining on the final catalyst composition, citric acid may often be employed in the impregnating solution in combination with the hydrogenation components, and particularly when the pH of the impregnating solution is less than 1.0.

Several methods may be employed to impregnate the catalytic support particles with an impregnating solution. One such method, commonly referred to as the spray impregnation technique, involves spraying the support with the impregnating solution. Another impregnating method, often used to maintain relatively low concentrations of hydrogenation components in the solution, is the circulation and multi-dip procedure wherein the support is repeatedly contacted with the impregnating solution with or without intermittent drying. Preferred methods, however, require soaking the support in an impregnating solution, circulating the support therein, or circulating the solution about the support, as for example, the pore volume or pore saturation technique, the continuous solution impregnation technique and the like. The pore saturation method involves dipping the catalyst support into an impregnating solution having a volume usually sufficient to fill the pores of the support and, on occasion, may be up to about 10 percent excess. The concentrations of hydrogenation components in the solution during impregnation by this technique may be somewhat higher than those utilized in other methods because the ratios of hydrogenation components in the final catalyst are determined directly by solution composition.

The amounts of active hydrogenation components retained on the support particles during impregnation will depend largely on physical characteristics of the support particles, inter alia, surface area, pore volume and pore size distribution. Broadly speaking, the support particles have a surface area of about 10 to about 400 m$^2$/gram and typically above 100 m$^2$/gram, and preferably about 125 m$^2$/gram to about 300 m$^2$/gram (as measured by the B.E.T. method). The total pore volume of the amorphous support, as measured by conventional mercury porosimeter methods, is ordinarily greater than about 0.35 cc/gram, usually about 0.35 to about 0.8 cc/gram, preferably about 0.5 to about 0.8 cc/gram, and most preferably between about 0.55 and about 0.75 cc/gram.

Physical characteristics of the support particles utilized to prepare the catalyst of the invention, as determined by conventional mercury porosimeter testing methods, typically include a narrow pore size distribution wherein at least 45 percent, preferably at least 50 percent, and most preferably at least 55 percent of the total pore volume is in pores of diameter from about 20 angstroms below the median pore diameter to about 20 angstroms above the median pore diameter. On a pore volume basis, the support ordinarily has at least about 0.25 cc/gram, preferably at least about 0.30 cc/gram, and most preferably at least about 0.35 cc/gram of the total pore volume in pores of diameter from about 20 angstroms below the median pore diameter to about 20 angstroms above the median pore diameter. Also, the support usually has at least 25 percent, and preferably at least 30 percent of the total pore volume in pores of diameter from about 10 angstroms above the median pore diameter to about 10 angstroms below the median pore diameter. On a pore volume basis, at least 0.15 cc/gram and preferably at least 0.20 cc/gram of the total pore volume is in pores of diameter from 10 angstroms above to 10 angstroms below the median pore diameter. The median pore diameter, as referred to herein, is the pore diameter representing one half of the total pore volume on a pore size distribution curve of a support or catalyst. The median pore diameter of the support particles usually lies in the range from about 110 to about 150 angstroms and preferably from 120 to 145 angstroms.

An unusual feature of the pore size distribution of the support is the amount of total pore volume in pores of diameter greater than about 300 angstroms. The support ordinarily has at least about 4 percent, or, in the alternative, usually at least about 0.025 cc/gram of the total pore volume in pores of diameter greater than 300 angstroms, yet does not contain more than about 10 percent of the total pore volume in pores of diameter greater than 300 angstroms. Also, the support contains less than 15 percent, preferably less than 12 percent, or, in the alternative, less than about 0.085 cc/gram and preferably less than 0.080 cc/gram, of the total pore volume in pores of diameter less than 100 angstroms. Physical characteristics of a preferred amorphous refractory oxide support utilized in preparation of catalysts of the invention are summarized in Table I as follows:

TABLE I

| Pore Diameter | Support N | |
|---|---|---|
| Angstroms | cc/gram | % PV |
| <90 | 0.04 | 6.3 |
| 90–100 | 0.043 | 7.0 |
| 100–110 | 0.07 | 10.9 |
| 110–120 | 0.075 | 11.7 |
| 120–130 | 0.095 | 14.9 |
| 130–140 | 0.09 | 14.1 |
| 140–150 | 0.07 | 10.9 |
| 150–160 | 0.035 | 5.5 |
| 160–170 | 0.025 | 3.9 |
| 170–180 | 0.015 | 2.3 |
| >180 | 0.08 | 12.5 |
| PORE VOLUME cc/gram (Merc. Poros.) | 0.64 | |
| MEDIAN PORE DIAMETER, A (Merc. Poros.) | 130 | |
| SURACE AREA m²/gram (B.E.T. method) | 190 | |

After impregnation, the support is dried and calcined to produce a catalyst containing the hydrogenation components in desired proportions. Calcination is usually at a temperature of at least 700° F., and preferably from about 750° F. to about 1,400° F., so as to convert the hydrogenation metals to their oxide forms. However, impregnated support particles containing a significant portion of nickel are calcined at a temperature preferably less than about 1,100° F., although support particles containing significant amounts of cobalt may preferably be calcined up to about 1,400° F. Furthermore, when calcining support particles impregnated with a solution containing a Group VIII metallic nitrate, flowing air is usually passed at a sufficient rate over the support particles to remove the nitrogen oxides (NO and $NO_2$) produced by the reactions associated with nitrate component decomposition.

The final composition of the catalyst of the invention preferably contains at least one metal hydrogenation component on the support particles although the composition may be free of hydrogenation metals. The physical characteristics of the final catalyst composition will usually vary from those of the support particles by less than about 25 percent. The final composition generally contains less than 15 weight percent, usually in the range from about 1 to about 15 weight percent, and preferably from about 2 to about 13 weight percent of at least one metal hydrogenation component, calculated as the metal trioxide. A preferred catalyst contains a Group VIB metal component and/or a Group VIII metal component, usually in the range from about 5 to about 10 weight percent calculated as the Group VIB metal trioxide, and about 0.01 to about 6 and usually about 1 to about 6, most preferably about 1 to about 4 weight percent, calculated as the Group VIII metal monoxide, respectively. The preferred Group VIB metal components include molybdenum and tungsten, with molybdenum the most highly preferred. The preferred Group VIII metal components include cobalt and nickel. Although the support and/or final catalyst described herein is essentially phosphorus-free, another component which may be included in the catalyst is a phosphorus component, usually in an amount from about 0.05 to about 1.5 weight percent, calculated as P. As herein mentioned before, the overall content of silica in the catalyst is usually about 1.5 to about 8.0 weight percent, preferably between 1.8 and 7.8 weight percent, and most preferably between 2.2 and 4.5 weight percent.

In accordance with the invention, a catalyst is prepared so as to have a narrow pore size distribution wherein at least 45 percent, or, in the alternative, at least 0.25 cc/gram of the total pore volume is in pores of diameter from about 20 angstroms below the median pore diameter to about 20 angstroms above the median pore diameter. The median pore diameter is normally above 120 angstroms usually in the range from about 125 to about 240 angstroms, preferably between 120 and 220 angstroms, and most preferably between 120 and 140 angstroms. Ordinarily less than about 10 percent of the total pore volume is contained in pores of diameter less than 100 angstroms, and at least about 3 percent of the total pore volume is contained in pores of diameter greater than 300 angstroms. Furthermore, the catalyst may have a pore size distribution wherein at least 50 percent of the total pore volume is in pores of diameter from about 20 angstroms below the median pore diameter to about 20 angstroms above the median pore diameter, less than 10 percent of the total pore volume is in pores of diameter less than 100 angstroms and greater than about 4 percent to less than about 10 percent of the total pore volume is in pores of diameter greater than 240 angstroms and at least about 30 percent of the total pore volume in pores of diameter from about 10 angstroms above to about 10 angstroms below the median pore diameter. Physical characteristics of the catalyst of the invention including pore size distribution, median pore diameter (mpd), surface area and total pore volume are summarized in Table II.

TABLE II

| Pore Size Distribution Diameter in | Physical Characteristics of Catalyst | | |
|---|---|---|---|
| | % of Total Pore Volume | | |
| Angstroms | Typical | Preferred | Most Pref. |
| <100 | <10 | <9 | <8 |
| >300 | >3 | 3–10 | 4–10 |
| 100–300 | >75 | >85 | >90 |
| mpd ± 20 | >45 | >50 | >55 |
| mpd ± 10 | >25 | >30 | >35 |
| >120 | >50 | >70 | >75 |
| >240 | <10 | <9 | <8 |
| mpd | >120 | >120 <240 | >120 <160 |

The total pore volume of the final catalyst of the invention preferably is greater than 0.45 cc/gram. On a pore volume basis, ranges of porosity characteristics of such preferred catalysts are summarized in Table IIA.

TABLE IIA

| Pore Size Distribution Diameter in | Physical Characteristics of Catalyst | | |
|---|---|---|---|
| | Amt. of Tot. Pore Vol., cc/g | | |
| Angstroms | Typical | Preferred | Most Pref. |
| <100 | <0.055 | <0.050 | <0.046 |
| >300 | >0.01 | >0.015 | >0.02 |
| 100–200 | >0.35 | >0.40 | >0.45 |
| mpd ± 20 | >0.28 | >0.30 | >0.31 |
| mpd ± 10 | >0.15 | >0.16 | >0.17 |
| >120 | >0.30 | >0.35 | >0.40 |
| >240 | <0.07 | <0.06 | <0.05 |

One of the unusual features of the catalyst of the invention is the combination of the following porosity characteristics: (1) a substantial amount of pore volume within both 10 and 20 angstroms from a median pore diameter in the range from greater than 120 to less than 240 angstroms, (2) a relatively small amount of pore volume, i.e., less than 10 percent, in pores of diameter less than 100 angstroms and/or greater than 300 angstroms, and (3) a significant amount of pore volume in pores of diameter greater than 120 angstroms, i.e., at least 50 percent, preferably greater than 60 percent and more preferably at least about 70 percent (or greater than 0.30 cc/gram). It is theorized that minimizing the number of minipores (pores of diameter less than 100 angstroms) and maximizing the number of macropores (pores of diameter greater than 120 angstroms) up to a limit of about 80 percent of the total pore volume contributes to available surface area in pores of diameter allowing both sulfur-containing and metal-containing molecules to penetrate into the catalyst; the invention, however, is not limited to this or any other theory of operation.

After calcination, the final catalyst is generally activated by conventional means for its intended use in a given hydroprocess of a hydrocarbon-containing oil. The catalyst may, for example, be activated by converting the hydrogenation metal components from the oxide form to the sulfide form. When employed with active components in the sulfide form, the catalyst may be presulfided so as to convert the active metal components to the corresponding sulfides. Usually the catalysts are presulfided prior to use by such methods as contact with a stream of sulfiding gas, such as hydrogen sulfide-hydrogen mixtures containing about 1 to 10 volume percent of hydrogen sulfide, at temperatures between about 200° F. and 1,200° F., or contact with sulfur-containing hydrocarbon feedstreams which normally boil at a temperature less than about 1000° F. Although presulfiding of the catalyst is preferred, it is not essential, as the catalyst may be sulfided "in situ" in a short time by contact with a sulfur-containing feedstock processed under hydroprocessing conditions. Alternatively, the catalyst may be ex-situ sulfided and transferred into a reactor.

The catalyst of the invention may be employed in any of several processes for hydroprocessing hydrocarbon-containing oils wherein catalytic composites containing Group VIB and/or Group VIII metals are known to be catalytically effective, such as for hydrogenation, dehydrogenation, hydrodesulfurization, oxidation, hydrodenitrogenation, hydrodemetallation, hydroisomerization, hydrocracking, mild hydrocracking, hydroreforming, and the like. Contemplated for treatment by the process of the invention are relatively high boiling hydrocarbon-containing oils including crude petroleum oils and synthetic crudes. Among the typical oils contemplated are crudes, vacuum and atmospheric residual fractions, light and heavy atmospheric and vacuum distillate oils, deasphalted oils, shale oils, and oils from bituminous sands, coal compositions and the like. For use herein, typical hydrocarbon-containing oils, or mixtures thereof, may contain at least about 10 volume percent of components normally boiling above about 1,050° F. and in some cases, at least 20 volume percent. Other hydrocarbon-containing oils include lubricating oils, waxes, kerosene, solvent naphthas, fuel oils, diesel fuels, jet fuels, heavy napthas, light naphthas, cycle oils from cracking operations, coker distillates, cracked gasoline, decant oils and the like.

Although virtually any high boiling hydrocarbon-containing feedstock may be treated by hydroprocessing with the catalyst of the invention, the process is particularly suited to treating residuum-containing oils, i.e., heavy residual fractions, especially the atmospheric and vacuum residuum oils containing at least about 2 ppmw, and usually greater than 50 ppmw of contaminant metals (vanadium, nickel, iron, and the like). Ordinarily the feedstock contains less than 500 ppmw of nickel and vanadium contaminant metals, calculated as Ni plus V, with preferred feedstocks containing less than 200 ppmw of said metals. Sulfur is usually present in such oils in a proportion exceeding 0.1 weight percent usually exceeding 1.0 weight percent. A particularly preferred proportion of sulfur is about 1 to about 8 weight percent. The feedstock contains undesirable proportions of nitrogen, usually in a concentration greater than about 2 ppmw and often between about 2 ppmw and 1.0 weight percent, calculated as N.

The catalyst may be employed as either fixed, bunker flow, ebullating, slurried or fluidized bed (but most usually a fixed bed) of particulates in a suitable reactor vessel wherein the hydrocarbon oil to be treated is introduced and subjected to hydroprocessing conditions including an elevated total pressure, temperature, and hydrogen partial pressure. Under such conditions, the hydrocarbon oil, particularly a residuum-containing feedstock, and catalyst are subjected to a hydrogen partial pressure usually in the range from about 100 to about 4,000 p.s.i.g. with the feedstock at a space velocity usually in the range from about 0.05 to about 10 LHSV so as to effect the desired degree of hydroprocessing, as for example, demetallization, desulfurization and/or denitrogenation, i.e., to effect the desired degree of conversion of sulfur, nitrogen and metal-containing compounds to hydrogen sulfide, ammonia, and metal forms capable of being deposited in the catalyst, respectively. Furthermore, the presence of water in the reaction zone can be highly effective for improved activity and stability of the catalyst of the invention, particularly for hydroprocessing a residuum-containing feedstock. Ordinarily at least 0.5 and usually at least 2.0 weight percent water (relative to the weight of the feedstock) is present in the reaction zone.

In the hydroprocessing of a hydrocarbon oil, the catalyst of the invention is usually maintained in a hydroprocessing reactor as a fixed bed with the feedstock passing downwardly once therethrough. In some instances, one or more additional reactors may be added to the single reactor, either in series or parallel. If the feedstock is usually high in organometallic compounds, it may be pretreated, integrally or separately, using a conventional hydrodemetallation catalyst or a catalyst of the invention. In one embodiment, the catalyst of the invention is located downstream relative to a conventional hydrodemetallation catalyst having a substantial amount of pore volume in pores of diameter greater than that of the catalyst of the invention.

Typical hydroprocessing conditions suitable for hydrodenitrogenation, hydrodesulfurization and hydrodemetallation of a hydrocarbon-containing feedstock are shown in the following Table III:

TABLE III

| Operating Conditions | Typical Range | Preferred Range |
|---|---|---|
| Temperature, °F. | 400–900 | 600–850 |
| Hydrogen Pressure, p.s.i.g. | 200–4,000 | 500–2,500 |
| Space Velocity, LHSV | 0.05–10 | 0.1–5.0 |

TABLE III-continued

| Operating Conditions | Typical Range | Preferred Range |
| --- | --- | --- |
| Hydrogen Recycle Range, scf/bbl | 500-15,000 | 1,000-10,000 |

Operating conditions that yield less than about 10 volume percent conversion of the oil fraction boiling above 1,050° F. to liquid products boiling at or below 1,050° F. usually include a temperature less than about 720° F. For such conversions of more than about 40 volume percent, a temperature greater than about 770° F. is utilized, while 10-40 volume percent conversions are typically achieved in the temperature range from about 720° F. to about 770° F.

Generally, the hydrogen partial pressure maintained during hydroprocessing is more than 50 percent of the total reactor pressure. Usually for once-through operation, the hydrogen partial pressure is between about 85 and 99 percent of the total reactor pressure while, for recycle operation, the hydrogen partial pressure is somewhat lower, i.e., between 80 and 90 percent of the total pressure.

The hydroprocess of the invention may include either serial or simultaneous demetallation, desulfurization and denitrogenation of a feedstock. Simultaneous demetallation, desulfurization, denitrogenation and heavy component (1,050° F. plus components) conversion, as used herein, involves contacting a hydrocarbon-containing feedstock with the particulate catalyst of the invention under conditions effecting (1) a lower contaminant metals, sulfur and/or nitrogen content in the effluent and (2) a higher percentage of liquid products boiling at or below 1,050° F. in the effluent as compared to the feedstock. Serial demetallation, desulfurization and denitrogenation of a feedstock by contact with the catalyst of the invention involves removing sulfur and nitrogen from the feedstock either prior to, concurrently, or after contact of the feedstock with a catalyst effective for removing a substantial proportion of contaminant metals from the feed.

A preferred embodiment utilizes the dual functionality of the catalyst of the invention, that is, the capability of the catalyst of the invention to function as an effective demetallation catalyst and simultaneously as an effective desulfurization and/or denitrogenation catalyst. This embodiment comprises a combined hydrodemetallation, hydrodesulfurization and hydrodenitrogenation reaction zone wherein the catalyst of the invention is located in an upstream portion of a fixed bed relative to a downstream catalyst bed portion containing a desulfurization and/or denitrogenation catalyst having a median pore diameter of at least 20, and preferably 30 angstroms smaller than that of the catalyst of the invention. In contrast to utilizing a conventional catalyst containing less silica and substantially more larger-sized pores in an upstream location of the catalyst bed, the catalyst of the invention in the upstream location exhibits better activity for removing both contaminant metals and nitrogen and/or sulfur, during the conversion of 1,050° F.+ components to 1,050° F.- components in the hydrocarbon-containing feed.

The invention is further illustrated by the following examples which are illustrative of specific modes of practicing the invention and are not intended as limiting the scope of the invention as defined in the appended claims.

EXAMPLE I

Catalyst A prepared in accordance with the invention, is tested under typical hydrodesulfurization conditions against a reference hydrodesulfurization catalyst, Catalyst X. Catalysts A and X have a 1/20 inch trilobal cross-sectional shape and have nominal compositions of 8.0 weight percent of molybdenum components, calculated as $MoO_3$, 2.0 weight percent of cobalt components, calculated at CoO, and the balance of gamma alumina support containing 3.0 and 2.0 weight percent of silicon, calculated as $SiO_2$, respectively. Catalyst A and X are prepared as follows:

An impregnating solution is prepared by placing 13.6 grams of ammonium heptamolybdate (AHM) in a beaker containing 45 ml of water. With vigorous stirring, 8 grams of citric acid (monohydrate) is added, and all of the solids are dissolved. Cobalt nitrate $[Co(NO_3)_2 \cdot 6 H_2O]$ in the amount of 10.7 grams is then dissolved in the resulting solution. After dissolution of the cobalt nitrate, an impregnating solution having a volume of 88 ml is prepared. The procedure is repeated to produce two impregnating solutions having the same final volume.

Two different portions of amorphous support particles containing gamma alumina and silica are prepared by mixing aqueous solutions of sodium aluminate with sodium silicate followed by slowly adding a diluted sulfuric acid solution followed by alum solution. The resulting aluminate/silicate solution has a pH in the range from about 5 to about 6. An aqueous ammonium hydroxide solution is mixed with the resulting aluminate/silicate solution to raise the pH sufficiently (i.e. in the range from about 8-10) to precipitate an alumina-silica solid material (typically a gel). Excess water is drained and then the alumina-silica solid material is washed (to remove primarily sodium impurities), dried and powdered. The powder is moistened and extruded through a die and calcined at approximately 1,200° F. One portion of the calcined support particles designated M, contains 3.0 weight percent of silica, calculated as $SiO_2$, and the second portion of support particles, designated as N, contains 2.0 weight percent of silica, calculated as $SiO_2$.

Two 125 grams portions of gamma alumina support particles M (preparation of Catalyst A) and N (preparation of Catalyst X), having pore size distributions as shown in Table I herein, are then contacted with the impregnating solution. Substantially all 88 ml of each impregnating solution is taken up by each of the supports.

The impregnated composition is allowed to stand (age) for two hours, following which it is oven dried at 110° C. and then calcined at 1,022° F. for one-half hour in flowing air. The final catalyst of the invention, Catalyst A, and reference Catalyst X, contain overall silica amounts of approximately 2.8 and approximately 1.8 weight percent, calculated as $SiO_2$, respectively, and have pore size distributions as shown in Table IV.

TABLE IV

| Pore Diameter, Angstroms | Pore Size Distributions and Surface Areas | | | |
| --- | --- | --- | --- | --- |
| | Catalyst X | | Catalyst A | |
| | P.V. | % | P.V. | % |
| <90 | 0 | 0 | 0.025 | 4.3 |
| 90-100 | 0 | 0 | 0.022 | 3.8 |
| 100-110 | 0.003 | 0.5 | 0.038 | 6.5 |

TABLE IV-continued

Pore Size Distributions and Surface Areas

| Pore Diameter, Angstroms | Catalyst X P.V. | Catalyst X % | Catalyst A P.V. | Catalyst A % |
|---|---|---|---|---|
| 110–120 | 0.010 | 1.7 | 0.058 | 9.9 |
| 120–130 | 0.016 | 2.7 | 0.092 | 15.7 |
| 130–140 | 0.030 | 5.0 | 0.087 | 14.9 |
| 140–150 | 0.041 | 6.9 | 0.073 | 12.5 |
| 150–160 | 0.115 | 19.3 | 0.050 | 8.5 |
| 160–170 | 0.165 | 27.8 | 0.025 | 4.3 |
| 170–180 | 0.121 | 20.3 | 0.023 | 3.9 |
| 180–190 | 0.024 | 4.0 | 0.015 | 2.6 |
| 190–200 | 0.010 | 1.7 | 0.012 | 2.0 |
| >200 | 0.060 | 10.1 | 0.065 | 11.1 |
| TOTAL PORE VOLUME, cc/g (Merc. Poros.) | 0.595 | | 0.585 | |
| Median Pore Diameter, Å (Merc. Poros.) | 167 | | 137 | |
| Surface Area m²/gram | 139 | | 165 | |

However, at the outset of each run, the respective catalysts are presulfided by contact for about 16 to 20 hours with a gas consisting of 90 volume percent $H_2$ and 10 volume percent $H_2S$ flowing at 4.4 SCFM (one atmosphere pressure). The temperature during the presulfiding is initially at room temperature, is increased gradually until 700° F. is reached, and then lowered to 450° F., at which time the catalyst is contacted with the feedstock.

TABLE V

Feedstock Properties

| Feed Description | Kuwait Atmospheric Resid |
|---|---|
| Gravity, °API | 14.4 |
| Sulfur, wt. % | 4.15 |
| Total Nitrogen, wt. % | 0.270 |
| Asphaltenes (C₅), wt. % | 8.6 |
| Nickel, ppmw | 15 |
| Vanadium, ppmw | 56 |
| ASTM D-1160, Vol. % | Distillation, °F. |
| IBP/5 | 593/633 |
| 10/20 | 698/794 |
| 30/40 | 858/915 |
| 50/60 | 992/1072 |
| max | 1101 |
| rec. | 65.0 |

A portion of the feedstock is passed downwardly through a reactor vessel and contacted in separate runs with Catalyst A and Catalyst X, in a single-stage, single-pass with once-through hydrogen. The operating conditions during each run are summarized as follows: 2,400 p.s.i.g. total (hydrogen) pressure, 1.0 LHSV, a hydrogen rate of 5,000 SCF/bbl, and an initial temperature of 720° F. The test is conducted by contacting the catalysts in separate runs for 12 days with the feedstock identified in Table V under hydroprocessing conditions and an additional 7 days of each run with 7.6 mole % of water injected into the hydrogen.

Giving Catalyst X employed at 12 days in the reference hydroprocess an arbitrary activity of 100, the relative activities (RVA) of Catalyst A of the invention and Catalyst X for desulfurization and demetallation are determined by calculation and tabulated in comparison to Catalyst X in Table VI. These desulfurization and demetallation activity determinations are based on a comparison of the reaction rates for desulfurization and demetallation obtained from the data of the experiment according to the following standard equation which assumes second order kinetics for desulfurization and demetallation:

$$\begin{array}{c}\text{Relative} \\ \text{Desulfurization} \\ \text{Activity}\end{array} = \frac{(1/S_p) - (1/S_f)}{(1/S_{pr}) - (1/S_f)} \times 100$$

where $S_f$ and $S_{pr}$ are the respective concentrations of sulfur in the feed and product obtained with the reference catalyst and $S_f$ and $S_p$ are the respective concentrations of sulfur in the feed and product obtained with a catalyst being compared to the reference.

$$\begin{array}{c}\text{Relative} \\ \text{Demetallation} \\ \text{Activity}\end{array} = \frac{(1/M_p) - (1/M_f)}{(1/M_{pr}) - (1/M_f)} \times 100$$

where $M_f$ and $M_{pr}$ are the respective concentrations of sulfur in the feed and product obtained with the reference catalyst and $M_f$ and $M_p$ are the respective concentrations of metals in the feed and product obtained with a catalyst being compared to the reference.

The relative volume activity (RVA) for metals, nitrogen and sulfur conversion calculated at day 12 of each run is obtained for each catalyst, with and without water, and set forth in Table VI. The data in Table VI indicate that Catalyst A containing support particles having the indicated silica content and porosity are more active than the reference catalyst.

TABLE VI

| Catalyst | days | RVA for sulfur removal, S 1–12 | RVA for sulfur removal, S 13–19 | RVA for metals removal, Ni + V 1–12 | RVA for metals removal, Ni + V 13–19 | RVA for nitrogen removal, N 1–12 | RVA for nitrogen removal, N 13–19 |
|---|---|---|---|---|---|---|---|
| A | | 115 | 165 | 103 | 114 | 140 | 140 |
| X | | 100 | 130 | 100 | 107 | 100 | 104 |

Data from the respective runs indicate the temperature increase requirement (i.e., TIR) for sulfur removal over days 2–12 is 0.5° F./day and 2.6° F./day for catalyst A and X, respectively, and 0.3° F./day and 0.8° F./day with water addition, respectively. Also, the data from the runs indicate the TIR for metals removal over days 2–12 is 1.4° F./day and 0.3° F./day for catalyst A and X, respectively. Furthermore, the TIR for nitrogen removal over days 2–12 is essentially 0 and 1.7° F./day, respectively, and essentially 0 and 0.9° F./day with water addition, respectively.

It is surprising that Catalyst A of the invention is more active for demetallation, either with or without water addition, than Catalyst X which has substantially larger pores, i.e., a median pore diameter of 167 angstroms for Catalyst X vs. 137 angstroms for Catalyst A, while also maintaining such superiorities for desulfurization and denitrogenation.

EXAMPLE II

Reference Catalyst X of Example I and two other catalysts, Catalysts C and D, are tested in separate runs for hydroprocessing a residuum feedstock having the characteristics summarized in Table VII under similar conditions as Example I, except the pressure is 2,000 p.s.i.g., the space velosity is 0.5 (LHSV), and the hydrogen rate is 6,000 scf/bbl.

TABLE VII

| Feedstock Properties | |
| --- | --- |
| Feed Description | LAR Atmospheric Resid |
| Gravity, °API | 15.9 |
| Sulfur, wt. % | 2.08 |
| Total Nitrogen, wt. % | 0.60 |
| Asphaltenes (C$_5$), wt. % | 11.3 |
| Nickel, ppmw | 55 |
| Vanadium, ppmw | 108 |
| ASTM D-1160, Vol. % | Distillation, °F. |
| IBP/5 | 391/573 |
| 10/20 | 648/723 |
| 30/40 | 788/853 |
| 50/60 | 926/1018 |
| max | 1101 |
| rec. | 68.0 |

Catalyst C and D are prepared in the same manner as Catalyst A in Example I, except the overall silica contents are nominally 7.8 and 1.8 weight percent (calculated as SiO$_2$), respectively, (obtained from alumina-silica supports containing 8.0 and 2.0 weight percent of silica, respectively) and the median pore diameters are each about 115 angstroms.

The relative volume activity (RVA) for metals and sulfur conversion calculated at day 12 of each run is obtained for each catalyst is set forth in Table VII.

TABLE VIII

| Catalyst | RVA for metal removal, Ni + V | RVA for sulfur removal, S |
| --- | --- | --- |
| X | 100 | 100 |
| C | 29 | 58 |
| D | 76 | 166 |

Data from the respective runs also indicate the temperature increase requirement (i.e., TIR) for sulfur removal is 3.8° F./day, 1.0° F./day and 1.1° F./day for catalysts C, D and X, respectively. Also, the data from the runs indicate the TIR for metals removal is 4.3° F./day, 1.1° F./day, and 0.8° F. /day for catalysts C, D and X, respectively.

Such data indicate that process employing reference Catalyst X, which performed worse than the process employing Catalyst A of the invention in Example I, is still more active and stable for demetallation than Catalysts C and D. The data also indicate that reference Catalyst X is still more active and stable for desulfurization than Catalyst C which contains a substantial number of pores of diameter smaller than those of Catalyst X.

While particular embodiments of the invention have been described, it will be understood, of course, that the invention is not limited thereto since many obvious modifications can be made, and it is intended to include within this invention any such modifications as will fall within the scope of the invention as defined by the appended claims.

We claim:

1. A catalyst composition comprising at least one Group VIB hydrogenation metal component supported on an amorphous, porous refractory oxide containing alumina and silica, said catalyst composition containing between 1.8 and 7.8 weight percent of silica, calculated as SiO$_2$, and said composition having a median pore diameter between 120 and 140 angstroms.

2. The composition defined in claim 1 wherein the overall silica content is between 2.2 and 4.5 weight percent, calculated as SiO$_2$.

3. The composition defined in claim 1 wherein at least 0.30 cc/gram of the total pore volume is in pores of diameter greater than 120 angstroms.

4. The composition defined in claim 1 further comprising at least one Group VIII hydrogenation metal component.

5. The composition defined in claim 4, wherein said Group VIII hydrogenation metal component is selected from the group consisting of cobalt and nickel, and said Group VIB hydrogenation metal component is selected from the group consisting of molybdenum and tungsten.

6. The composition defined in claim 1 further comprising a narrow pore size distribution wherein at least 45 percent of the pore volume is in pores of diameter within about 20 angstroms above to 20 angstroms below said median pore diameter.

7. The composition defined in claim 1 being essentially free of phosphorus components.

8. The composition defined in claim 5 consisting essentially of about 1.0 to about 4.0 weight percent of cobalt components, calculated as CoO, and about 5.0 to about 12.0 weight percent of molybdenum components, calculated as MoO$_3$, on said support comprising gamma alumina.

9. The composition defined in claim 2 wherein at least 50 percent of the total pore volume is in pores of diameter from about 20 angstroms above to about 20 angstroms below said median pore diameter and less than 10 percent of the total pore volume is in pores of diameter greater than 300 angstroms and less than 100 angstroms.

10. A catalyst composition comprising at least one Group VI metal hydrogenation component supported on an amorphous, porous refractory oxide containing alumina and silica, said catalyst composition containing an overall silica contact between 1.8 and 7.8 weight percent of silica, calculated as SiO$_2$, said composition having a median pore diameter in the range between 120 and 140 angstroms and at least 0.25 cc/gram of the total pore volume is in pores of diameter from about 20 angstroms above to about 20 angstroms below said median pore diameter.

11. The composition defined in claim 10 further comprising at least one Group VIII metal hydrogenation component.

12. The composition defined in claim 11 wherein said metal hydrogenation component is selected from the group consisting of cobalt, nickel, molybdenum and tungsten.

13. The composition defined in claim 10 wherein the overall silica content is between 1.8 and 7.8 weight percent, calculated as SiO$_2$.

14. The composition defined in claim 11 wherein at least 50 percent of the total pore volume is in pores of diameter from about 20 angstroms above to about 20 angstroms below said median pore diameter and less than 10 percent of the total pore volume is in pores of diameter greater than 300 angstroms and less than 100 angstroms.

15. The composition defined in claim 11 wherein at least 0.30 cc/gram of the total pore volume is in pores of diameter greater than 120 angstroms.

16. The composition defined in claim 12 wherein said Group VI metal hydrogenation component comprises about 5 to about 12 weight percent of molybdenum, calculated as MoO$_3$, and said Group VIII metal hydrogenation component comprises about 1 to about 4 weight percent of cobalt, calculated as CoO.

17. A catalyst comprising at least one molybdenum or tungsten component and at least one cobalt or nickel component on an amorphous, nonzeolitic support comprising gamma alumina and silica, said catalyst comprising between 1.8 and 7.8 weight percent of silica, calculated as SiO$_2$, and having at least 45 percent of the total pore volume in pores of diameter within 20 angstroms above or below a median pore diameter in the range between 120 and 140 angstroms.

18. The catalyst defined in claim 17 wherein less than 10 percent of the total pore volume is in pores of diameter greater than 300 angstroms and less than 100 angstroms.

19. The catalyst defined in claim 17 consisting essentially of about 5 to about 12 weight percent of molybdenum, calculated as MoO$_3$, and about 1 to about 4 weight percent of nickel or cobalt, calculated as the monoxide.

20. The catalyst defined in claim 19 wherein at least about 0.35 cc/gram of the total pore volume is in pores of diameter greater than 120 angstroms and less than about 0.05 cc/gram of the total pore volume is in pores of diameter less than 100 angstroms.

21. The catalyst defined in claim 20 wherein said silica content is between 2.2 and 4.5 weight percent.

* * * * *